(12) United States Patent
Austin et al.

(10) Patent No.: US 7,877,737 B2
(45) Date of Patent: Jan. 25, 2011

(54) TREE-TO-GRAPH FOLDING PROCEDURE FOR SYSTEMS ENGINEERING REQUIREMENTS

(75) Inventors: Mark A. Austin, Laurel, MD (US); Natalya Shmunis, Rockville, MD (US); Virnal Mayank, Raipur (IN); David Frank Everett, Laurel, MD (US)

(73) Assignees: University of Maryland, College Park, MD (US); The United States of America as represented by the United States National Aeronautics and Space Administration, Washington, DC (US)

( * ) Notice: Subject to any disclaimer, the term of this patent is extended or adjusted under 35 U.S.C. 154(b) by 1619 days.

(21) Appl. No.: 11/157,074

(22) Filed: Jun. 20, 2005

(65) Prior Publication Data

US 2006/0037019 A1    Feb. 16, 2006

Related U.S. Application Data

(60) Provisional application No. 60/590,771, filed on Jul. 23, 2004.

(51) Int. Cl.
G06F 9/45    (2006.01)
(52) U.S. Cl. .................................... 717/132
(58) Field of Classification Search .............. 717/132
See application file for complete search history.

(56) References Cited

U.S. PATENT DOCUMENTS

| | | | |
|---|---|---|---|
| 4,953,106 A * | 8/1990 | Gansner et al. ............ 345/440 |
| 5,606,654 A | 2/1997 | Schuur | |
| 5,892,682 A | 4/1999 | Hasley et al. | |
| 5,977,971 A | 11/1999 | Guzak et al. | |
| 6,105,062 A | 8/2000 | Andrews et al. | |
| 6,151,024 A | 11/2000 | Alimpich et al. | |
| 6,789,054 B1 * | 9/2004 | Makhlouf ................... 703/6 |
| 7,207,038 B2 * | 4/2007 | Bicsak et al. .............. 717/159 |
| 2003/0177018 A1 * | 9/2003 | Hughes ..................... 705/1 |

OTHER PUBLICATIONS http://www.vitechcorp.com/CORE/productline.html (2 pages).
http://www.telelogic.com/products/doorsers/doors/ (2 pages).
http://www.sdrc.com/slate/ (2 pages).

* cited by examiner

*Primary Examiner*—John Chavis
(74) *Attorney, Agent, or Firm*—Carter, DeLuca, Farrell & Schmidt, LLP

(57) ABSTRACT

A method is provided for generating a graph data representation having a plurality of nodes corresponding to respective systems engineering requirements. The method includes accessing a first data representation of a collection of systems requirements and relationships therebetween and generating a second data representation of the collection of systems requirements. The generating the second data representation includes accessing respective systems requirements of the collection of systems requirements; creating a node to correspond to each accessed systems requirement if a node corresponding to the accessed systems requirement does not exist; and creating an edge between the created or pre-existing node and each node corresponding to a systems requirement having a relationship with the accessed systems requirement. Each node of the second data representation is a node of said graph data representation and corresponds to a different systems requirement of the collection of systems requirements.

28 Claims, 5 Drawing Sheets

TREE-TO-GRAPH FOLDING PROCEDURE FOR SYSTEMS ENGINEERING REQUIREMENTS

PRIORITY

This application claims priority under 35 U.S.C. §119(e) to a U.S. Provisional Application filed on Jul. 23, 2004 and assigned U.S. Provisional Application No. 60/590,771; the entire contents of the provisional application are incorporated herein by reference.

STATEMENT REGARDING FEDERALLY SPONSORED RESEARCH

The invention described herein was made in the performance of work under NASA contracts NAG513642 and NAG512464 and by employees of the United States Government and is subject to the provisions of Section 305 of the National Aeronautics and Space Act of 1958, as amended, Public Law 85-568 (72 Stat. 435, 42 USC 2457), and may be manufactured and used by or for the Government for governmental purposes without the payment of any royalties thereon or therefor.

BACKGROUND

1. Field of the Disclosure

This disclosure relates to a tree-to-graph folding procedure for systems engineering requirements. In particular, this disclosure relates to a system and method for generating a data representation graph for systems engineering requirements having no duplicate nodes.

2. Description of the Related Art

Management in systems engineering includes identifying and managing systems engineering requirements at an early phase of the design process of a system, validating the systems requirements against the purposes and functions of the system, and verifying the systems engineering requirements against appropriate specifications. A systems engineering requirement is a criterion that a system must meet. Systems engineering requirements can include things the system must do, characteristics it must have, and levels of performance it must attain. Systems engineers develop systems engineering requirements before a system is created. As it is developed, the system is evaluated according to how well it meets its system engineering requirements.

Prior art software systems engineering requirements management tools provide support for managing system development, even for systems having tens-of-thousands of systems engineering requirements, such as for providing support for top-down development, which may include providing a database representation of the systems engineering requirements and connections between the systems engineering requirements, also known as a requirements document. Examples of prior art software management tools for system engineering which are currently commercially available include SLATE™, DOORS™ and CORE™.

In prior art software requirements management tools, systems engineering requirements may be organized and visualized as a tree, which is defined as an acyclic connected directed hierarchical graph having a plurality of nodes including one or more parent nodes and one or more child nodes. A parent node represents a defining systems engineering requirement, and a child node represents a complying systems engineering requirement. The actual systems engineering requirements may have a number of complicating relationships, such as multiple inheritance relationships, where a systems engineering requirement document or other data representation needs to support such relationships. Furthermore, systems engineering requirements data representations need to support hierarchical representations for representing different organizational levels. The organizational levels may enhance team development, where a particular level may be associated with a particular team.

The term "tree" refers to an acyclic connected directed hierarchical graph. Visualization of requirements in a tree format may use duplication of nodes for representing complicated relationships, preserving of organizational levels and/or eased of implementation in a computer environment. In engineering projects having large numbers of systems engineering requirements, the presence of duplicate nodes complicates the task of interpreting and understanding the relationships between the systems engineering requirements. As the number of systems engineering requirements increases, the ability to comprehensively manually identify duplicate nodes and all complying and defining relationships associated with each node becomes undependable and unfeasible. Reliance on a tree having duplicate nodes may lead to decision making based on an incomplete picture of a systems engineering requirement's role in the system design.

Furthermore, prior art requirements management tools represent individual systems engineering requirements by using textual descriptions without underlying semantics. Accordingly, search mechanisms are limited to the use of keywords. As a result, computational support for the validation and verification of requirements and searching capabilities are limited.

SUMMARY

In accordance with the present disclosure, a method is provided for generating a graph data representation having a plurality of nodes corresponding to respective systems engineering requirements. The method includes accessing a first data representation of a collection of systems requirements and relationships therebetween and generating a second data representation of the collection of systems requirements. The generating the second data representation includes accessing respective systems requirements of the collection of systems engineering requirements; creating a node to correspond to each accessed systems requirement if a node corresponding to the accessed systems requirement does not exist; and creating an edge between the created or pre-existing node and each node corresponding to a systems requirement having a relationship with the accessed systems requirement. Each node of the second data representation is a node of said graph data representation and corresponds to a different systems requirement of the collection of systems requirements.

In another embodiment of the disclosure a system is provided for generating a graph data representation having a plurality of nodes corresponding to respective engineering systems requirements. The system includes a processor assembly having at least one processor having access to a first data representation of a collection of systems engineering requirements and relationships therebetween, and a memory storing a series of executable instructions executable by the at least one processor for generating a second data representation. The execution of the series of executable instructions for generating the second data representations includes accessing respective systems requirements of the collection of systems requirements; creating a node to correspond to each accessed systems requirement if a node corresponding to the accessed systems requirement does not exist; and creating an edge between the created or pre-existing node and each node corresponding to a systems requirement having a relationship with the accessed systems requirement. Each node of the second data representation corresponds to a different systems requirement of the collection of systems requirements and is a node of said graph data representation.

In another embodiment of the disclosure a system is provided for generating a hierarchical graphic visualization of a graph data representation having a plurality of nodes corresponding to respective systems engineering requirements. The system includes a processor assembly having at least one processor for accessing a graph data representation having a plurality of first edges and a plurality of first nodes corresponding to the respective systems requirements, wherein each first node corresponds to a different systems requirement of the respective systems requirements and has an associated at least one attribute. Each first node is connected to at least one other first node by at least one first edge, wherein the at least one first edge defines relationships between the nodes of the plurality of first nodes. The system further includes a memory storing a series of executable instructions executable by the processor assembly for generating a hierarchical graphic visualization of the graph data representation having a plurality of second edges and a plurality of second nodes arranged graphically in at least two levels. Each second node corresponds to a respective first node and is connected to at least one other second node by at least one second edge. The at least one second edge preserves the relationships defined by the at least one first edge. Each node is arranged in a level of the at least two levels in accordance with an attribute of the at least one attribute associated with the node.

BRIEF DESCRIPTION OF THE DRAWINGS

Various embodiments of the disclosure will be described herein below with reference to the figures wherein.

DETAILED DESCRIPTION OF THE PREFERRED EMBODIMENTS

Figure 1:
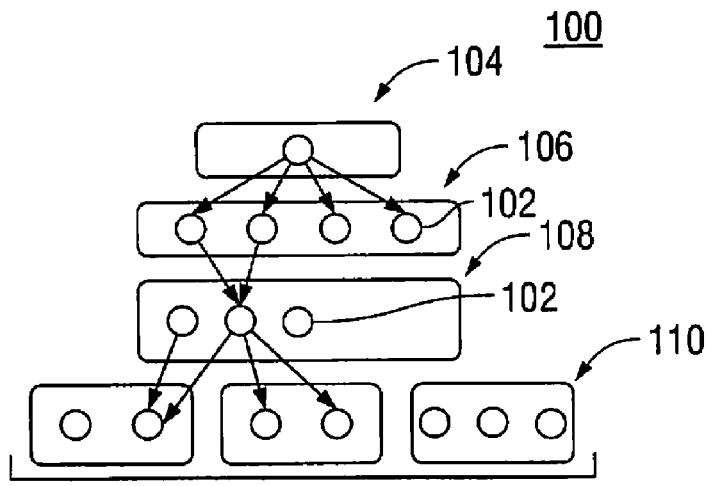
FIG. 1 is a diagram of a set of systems engineering requirements in accordance with the present disclosure.
Figure 2:
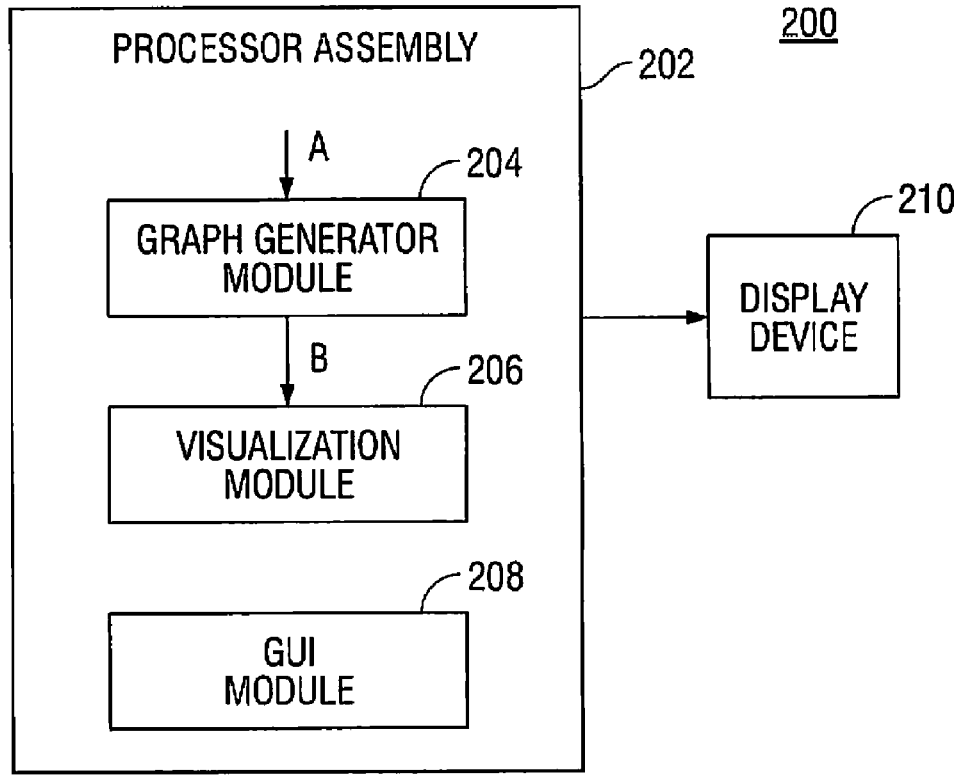
FIG. 2 is a system for processing systems engineering requirements in accordance with the present disclosure.

Reference should be made to the drawings where like reference numerals refer to similar elements throughout the various figures. FIG. 1 shows a representation 100 of a set of layered systems engineering requirements 102 for an exemplary engineering project, where the systems engineering requirements are also referred to throughout the present disclosure as systems requirements or requirements. Each exemplary layer corresponds to a respective layer of responsibility. The top layer 104 corresponds to a mission objective, layer 106 corresponds to science requirements, layer 108 corresponds to system-level systems engineering requirements and layer 110 corresponds to sub-system systems requirements. At level 110, the systems requirements may be organized into clusters suitable for team development. Further levels may be provided below level 110, such as directed at specific sub-systems of the sub-systems in layer 110, such as an instrument or a circuit. Software management tools, such as SLATE™, DOORS™ and CORE™, provide tools for representing and visualizing systems requirements.

The present disclosure provides a system 200 for processing systems engineering requirements, including generating a graph data representation of the systems requirements and displaying a graphic visualization of the generated data representation. System 200 includes a processor assembly 202, a graph generator software module 204, a visualization software module 206, and a graphical user interface (GUI) module 208, where the software modules 204, 206 and 208 are executable on the processor assembly 202. The system 200 further includes an output device 210 for outputting a graphic visualization generated by the visualization module 206.

The processor assembly 202 includes at least one processor, such as a microprocessor, a PC, a handheld computing device, a mobile phone, a mainframe computer, a network of computers, etc. Processors of the at least one processor may be included in one or more networks, such as LAN, WAN, Extranet, the Internet, etc. The processors may communicate via wired and/or wireless communication. The processor assembly 202 has access to at least one storage device, such as RAM, ROM, flash RAM, a hard drive, a computer readable medium, such as a CD-ROM, etc.

The software modules 204, 206 and 208 each include a series of programmable instructions executable by the processor assembly 202. The series of programmable instructions may be stored on a storage device which is accessible by the processor assembly 202, or transmitted via propagated signals for execution by the processor assembly 202 for performing the functions described herein and to achieve a technical effect in accordance with the disclosure. The output device 210 outputs graphically information that was received from the processor assembly 202, where the output device 210 is a device such as a computer monitor, a display screen for a handheld computing device, a printing device, a plotting device, etc., and the output is a graphical layout of the information on a display screen, a printout, etc.

The graph generator module 204 receives a first data representation A of a collection of related systems engineering requirements, where at least one node corresponds to each systems requirement, and an edge corresponds to each relationship between the systems requirements. Exemplary relationships include defining and complying relationships, wherein for a parent node and a child node, the child node to parent node relationship is a complying relationship, and the parent node to child node is a defining relationship. Comply and define relationships are a form of directed link, with other terminology such as outgoing and incoming sometimes used.

The first data representation input to the graph generator module 204 may be created input using a word processing or spreadsheet program, a database program, an XML editor, a custom-XML requirements editor, an AP233 editor, a requirements management tool, etc. The input data may be received as it is entered in real time via user input or as a complete file transferred from storage, another software module or another processor. AP233 is a standard for exchanging systems engineering data between different types of platforms. By providing the capability to handle AP233, the system 200 may process information provided by any program or device which complies with AP233.

The graph generator module 204 transforms the first data representation A into a second data representation B in which all duplication of nodes existing in the first data representation A is eliminated. For each eliminated duplicate node of the first data representation A, each edge connected to the node being eliminated is incorporated into the second data representation B as appropriate. The resultant second data representation B is a directed graph including a collection of nodes and edges, in which there are no duplicate nodes. The second data representation B is a graph which may include one or more multiple inheritances, in which a child node of the directed graph may depend from (e.g., comply with) more than one parent node.

In the first and second data representations A, B, each systems engineering requirement represents a requirement or task for a particular project, such as a functional requirement, performance requirement or an interface requirement. The individual systems requirements are represented as data elements which are nodes. The systems requirements may be layered, e.g., where each node is associated with a particular level. Each systems requirement has a corresponding unique identification number, e.g., a requirement object identification number (ROIN); and may further have one or more tags or fields, such as for identifying and/or describing the systems requirement, including at least one associated attribute field, e.g., each attribute having a name and an associated value, such as for defining a level, e.g., a hierarchical level, assigned to the systems requirement; and connectivity data, such as a list of systems requirements which comply directly with the systems requirement, e.g., child nodes which depend directly from the systems requirement.

Table 1 below shows an exemplary systems requirement node written in extensible Metadata Language (XML), as provided by the systematic query and extraction of the requirement from a SLATE™ database. The systematic query and extraction procedure is implemented using a custom script file. Table 1 shows an exemplary system requirement having ROIN 8-378.

TABLE 1

| | |
|---|---|
| 1 | <Req ROIN="8-378" type="Mission Objective" level="0"> |
| 2 | <Title text="Programmatic Requirements"/> |
| 3 | <Description text="The GPM shall adhere to program requirements |
| 4 | as agreed between the NASA Earth Science Enterprise |
| 5 | and the NASA/GSFC GPM program office."/> |
| 6 | <ReqList> |
| 7 | <CompReq ROIN="8-2"/> |
| 8 | <CompReq ROIN="8-4"/> |
| 9 | <CompReq ROIN="8-5"/> |
| 10 | <CompReq ROIN="8-7"/> |
| 11 | <CompReq ROIN="8-8"/> |
| 12 | <CompReq ROIN="8-10"/> |
| 13 | <CompReq ROIN="8-11"/> |
| 14 | <CompReq ROIN="4-468"/> |
| 15 | <CompReq ROIN="8-251"/> |
| 16 | <CompReq ROIN="8-259"/> |
| 17 | <CompReq ROIN="8-57"/> |
| 18 | <CompReq ROIN="8-43"/> |
| 19 | <CompReq ROIN="8-26"/> |
| 20 | </ReqList> |
| 21 | <Attribute text="Assigned To" value="None"/> |
| 22 | <Attribute text="Change Proposals Allowed" value="Not Assigned"/> |
| 23 | <Attribute text="Criticality" value="None"/> |
| 24 | <Attribute text="ID" value=""/> |
| 25 | <Attribute text="Inheritable" value="Yes"/> |
| 26 | <Attribute text="Qualification Date/Time" value="YY/MM/DD-24:00"/> |
| 27 | <Attribute text="Rationale" value=""/> |
| 28 | <Attribute text=" Requirement State" value="Uncontrolled"/> |
| 29 | <Attribute text="Requirement Status" value="Active"/> |
| 30 | <Attribute text=" Requirement Title" value="Programmatic Requirements"/> |
| 31 | <Attribute text="Test Report Number" value=""/> |

TABLE 1-continued

| | |
|---|---|
| 32 | <Attribute text="Verification Date/Time" value="YY/MM/DD-24:00"/> |
| 33 | <Attribute text="Verification Description" value=""/> |
| 34 | <Attribute text="Verification Level" value="None"/> |
| 35 | Attribute text="Verification Method" value="None"/> |
| 36 | <Attribute text="Verification Status" value="None"/> |
| 37 | <Attribute text="Verified By" value="None"/> |
| 38 | </Req> |

The connectivity data shows that ROIN's 8-2,8-4, 8-5,8-7, 8-8,8-10, 4-468, 8-251, 8-259, 8-57, 8-43 and 8-26 are listed as complying with ROIN 8-378. A collection of systems requirements nodes, including connectivity properties and associated attributes, together form an XML file also known as a specifications document. The specifications document may be stored as a database of systems specifications and connectivity data (e.g., links) showing the relationships between the systems requirements. Requirements management tools may generate a list, e.g., database, of requirements in an XML specifications document, which may be configured as a hierarchical tree.

When another ROIN of the specifications document lists a specifications requirement which is already listed as a child node of ROIN 8-378 in its connectivity data, e.g., ROIN 8-2, a multiple inheritance is created. In a graphic visualization of the specifications document, the multiple inheritance may be resolved by creating multiple nodes for the child node which has two or more parents. However, a user that views one child node of the multiple child nodes does not view all of the compliance relationships which apply to the viewed child node, and may not be aware that multiple nodes exist which correspond to the same systems requirement as the viewed child node corresponds to. Accordingly, the user may be missing vital information when making decisions.

Figure 3:
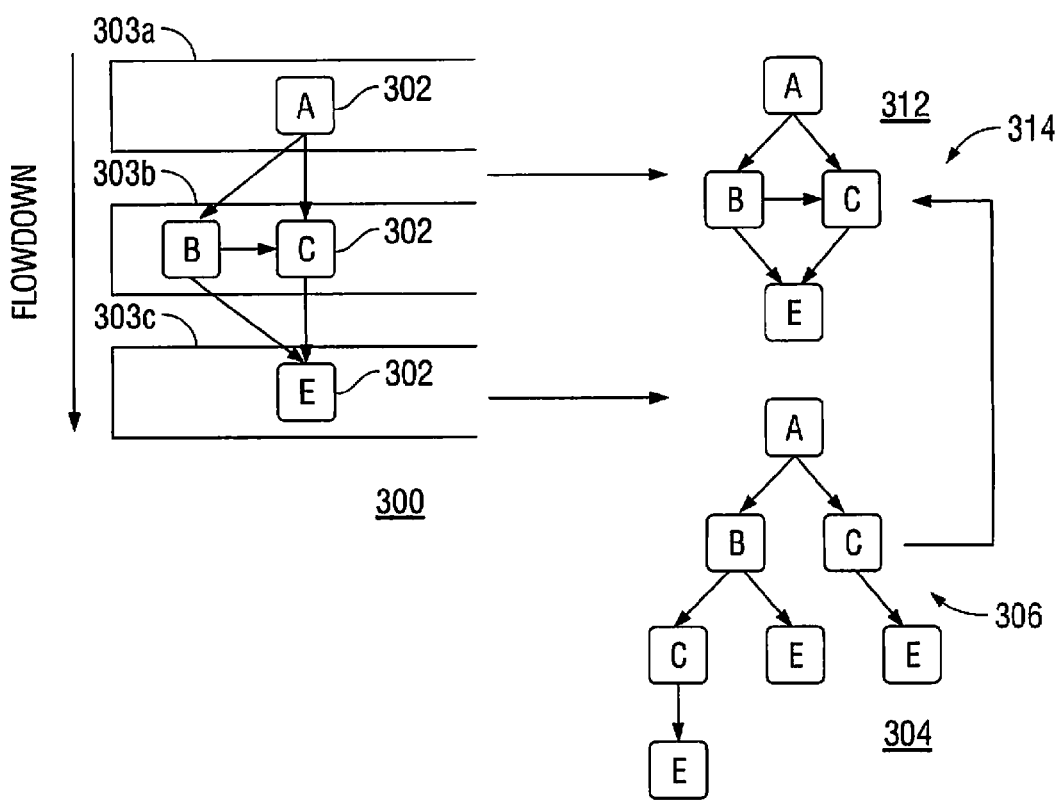
FIG. 3 shows data representations of systems engineering requirements in accordance with the present disclosure.

With reference to FIG. 3, a few data representations of systems requirements are shown. At diagram 300, a few exemplary systems requirements 302 described in a specifications document are shown arranged in accordance with levels (or layers) described in the specifications document. Levels 1, 2 and 3 are shown at 303a, 303b and 303c, respectively. Requirement A corresponds to level 1, requirements B and C correspond to level 2 and requirement E corresponds to level 3. The requirements management tool processes the specifications document and generates a first data representation which is a tree 306, shown in diagram 304, representing the specifications document.

The processor assembly 202 receives as input a first data representation, which is the specifications document, the tree 306, or another type of data representation (e.g., a list). The graph generator module 204 processes the input to generate a second data representation shown in diagram 312, which is a graph not having any duplicate nodes, which is herein referred to as a non-duplicate graph 314 that allows multiple inheritances. The visualization module 206 processes the second data representation, e.g., the non-duplicate graph 314, and generates a visual representation of the non-duplicate graph 314 showing hierarchies.

The tree 306 includes duplicate nodes for systems requirements C and E. For a large scale project, a user of a tree having duplicate nodes may view only a segment of the tree, not be aware of the existence of duplicate nodes, not be able to locate all duplicates of a node, and/or not be able to determine all of the define and comply relationships corresponding to a systems requirement 302 represented as more than one node, e.g., nodes C and E.

The graph generator module 204 generates the non-duplicate graph 314 by folding or collapsing the first data representation, e.g., the tree 306, into the non-duplicate graph 314 by creating one node for each systems requirement 302, including removing all duplicate nodes, and creating an edge for each of the define and comply relationships provided in the first data representation for generating the non-duplicate graph 314. In the non-duplicate graph 314, there are no duplicate nodes, and there is only one occurrence of each systems requirement 302. For each systems requirement 302 a user can see all of the define and comply relationships corresponding to the systems requirement 302 by looking at the one node that corresponds with the systems requirement 302 and all of the edges that connect directly to that node.

Other types of first data representations, such as a list, graph, hash table data structure, or a combination thereof, may be created, such as from the requirements document, for representing the systems requirements. Requirements documents may employ, for example, a format compliant with the AP233 standard, a format compliant with systems modeling language (SysML) specification, such as XML Metadata Interchange (XMI) representation, a database representation of the requirements document, or a text file format outlining the nodes and connections between them. Accordingly, the input to the graph generator module 204 may be a tree, another type of first data representation, or the requirements document.

Figure 4:
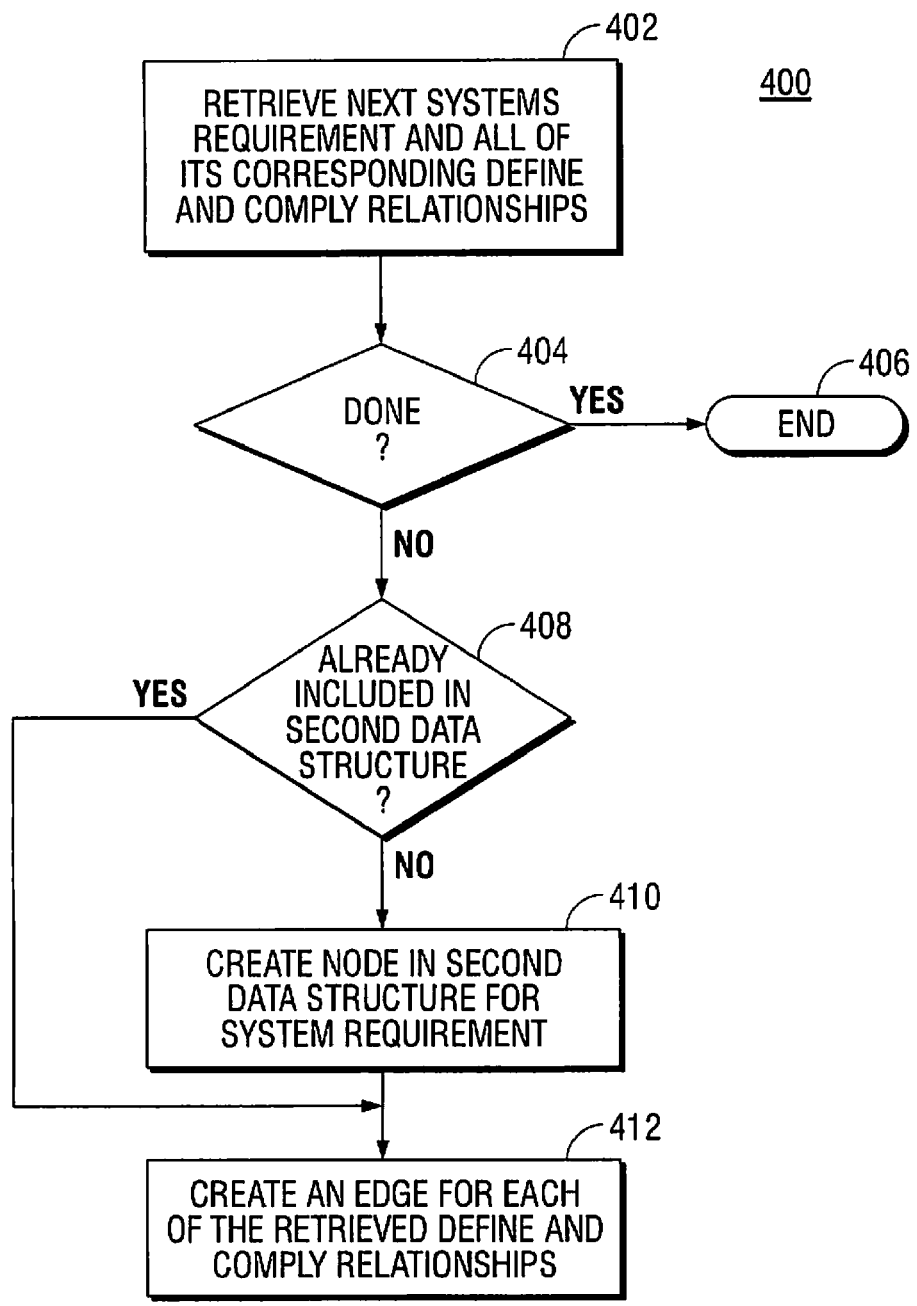
FIG. 4 is a flowchart of steps executed by a graph generator module of the system shown in FIG. 2.

FIG. 4 shows a flowchart 400 of steps executed by the graph generator module 204 for processing each systems requirement stored in the first data representation A for generating the second data representation B. At step 402, the graph generator module 204 accesses or retrieves a systems requirement of a node from the first data representation A and all of the relationships, e.g., edges, that correspond, e.g., connect directly, to the accessed node, including all of the define and comply relationships. Upon the first iteration of step 402, the graph generator module 204 accesses a systems requirement of a first node of the first data representation A, and for each iteration of step 402 the graph generator module 204 accesses a systems requirement of a next node of the first data representation A. The graph generator module 204 may use a known algorithm for walking through the first data representation A, e.g., a tree, in order to access each node thereof. Accordingly, each node of the first data representation A is processed, including duplicate nodes.

At step 404, a determination is made if all of the nodes of the first data representation A have been accessed. If "yes", then END step 406 is executed. If "no", then step 408 is executed. At step 408, a determination is made if the node accessed is a duplicate of another node already accessed, e.g., is already included in the second data representation B. For a first data representation A in which each systems requirement stored in the first data representation A has as a unique identifier, e.g., ROIN, the determination of step 408 may be performed by comparing the identifier of the systems requirement of the node accessed to the identifier of systems requirements of nodes already included in the second data representation. When the first data representation does not provide a unique identifier for each systems requirement, an algorithm may be used for comparing nodes and determining if a match exists between the node being accessed and the nodes already included in the second data representation.

If "no", step 410 is executed. At step 410, a node is created in the second data representation B for holding the systems requirement of the node accessed from the first data representation A. If "yes", step 410 is skipped, and step 412 is executed. At step 412, an edge is created for each of the accessed define and comply relationships which correspond with the accessed node. When no duplicate nodes are found in the first data representation A, it is possible that connectivity relationships among nodes in the second data representation B may be identical to the first data representation A.

The graph generator module 204 uses an algorithm for reading each node, determining if it is a duplicate of a node that was already read, and creating the non-duplicate graph of the second data representation by creating the nodes that were read without creating any duplicate nodes, and creating edges defining the relationships between all of the nodes. In one embodiment of the disclosure, the algorithm may be implemented using Resource Description Framework (RDF), which is a language for representing information about resources in the World Wide Web using a graph-based model. RDF provides semantics to encoded metadata and does not allow creation of duplicate resources, which adds capabilities of further processing of the second data representation.

Further processing of the second data representation may include (a) selecting a sub-section of the second data representation, such as for visualization thereof; (b) differential update of the first data representation, e.g., the specifications document or the tree, based on incremental changes to the second data representation; (c) annotating the nodes of a graphic visualization of the second data representation with their attributes of interest; and (d) graph related operations, such as union and intersection operations, e.g., merging, of more than one non-duplicate graph.

Selection of a sub-section of the second data representation may be facilitated, for example, using, a query language, such as RDF Document Query Language (RDQL), for writing queries to access selected nodes of the second data representation. Selection may be based, for example, on a connectivity property, an attribute, a specification of a node of interest for the sub-section of interest, a direction of visualization, where the directions include "up" for visualization of the defining requirements, and/or "down" for visualization of the complying requirements, and/or a number of levels to be included in the sub-section. A GUI may be provided by the GUI module 208 via which the user selects the node, direction and/or number of levels. The GUI may be menu based, include dialogue boxes, and/or a graphics editor for allowing the user to select the node of interest from the graphic visualization.

The differential update of the requirements document provides a mechanism for incorporating modifications to the second data representation into the first data representation, which may be, for example, the specifications document or the tree. Errors or the need to make modifications to the second data representation may be apparent when viewing the graphic visualization of the second data representation. In accordance with the present disclosure, the second data representation may be modified, such as by using a GUI provided by the GUI module 208 which may, for example, be menu based, include dialog boxes and/or include a graph editor for editing the graphic visualization of the second data representation and/or the second data representation. Edits to the graphic visualization of the second data representation may be incorporated into the second data representation, e.g., upon the user's request. Furthermore, the modifications made to the second data representation may be incorporated into the first data representation, the specifications document and/or the tree.

Annotating of the nodes allows for selectable attributes to be displayed for each node in addition to other information, such as the systems requirement's title and ROIN. When using the graph generator module 204 and the visualization module 206, the systems engineer is provided with a powerful and intuitive tool for submitting queries for selecting a subsection of the second data representation to be displayed, and selecting attributes associated with the systems requirements to be displayed.

Merging of two or more non-duplicate graphs may be useful for merging requirements documents of two or more different sources, such as sub-contractors or design teams. For example, a few requirements may be assigned to a particular group (such as a design team or a sub-contractor), where each group further defines its own particular set of systems requirements, or incorporates a dependency on a systems requirement assigned to another group. Merging of two or more non-duplicate graph may be facilitated using a tool such as Jena API.

The visualization module 206 receives as input a data representation which does not include any duplicate nodes. For example, the input to the visualization module 206 may be the specifications document, if it is believed that no duplicate nodes exist, or the second data representation. The visualization module 206 processes the input and generates a displayable version of the input data representation, e.g., the second data representation, for display on the output device 210, where the displayed data representation does not have any duplicate nodes and is displayed with a layout showing hierarchy of the nodes in accordance with a level or attribute.

The resulting display is easily comprehended by the user, as it shows the nodes in an easy to understand hierarchical layout with the systems requirements clustered in one direction, e.g., in layers stacked, such as from top to bottom, in accordance with an attribute or level associated with each systems requirements. Since the display does not include any duplicate nodes, all of the define and comply relationships for the systems requirement of each node are displayed for that node. Generation of the display may be implemented using a graph layout algorithm to position the systems requirement nodes on the screen of the output device 210.

The graphic visualization of the input data representation shows connectivity between nodes. Any node may be selected for visualization of connectivity and other properties associated with the node. For example, upon selecting a node, such as by clicking on the node, a window may appear adjacent the selected node in which information pertaining to the selected node is displayed. Using the graphic visualization, a node may be identified which is associated with a systems requirement which is a bottleneck requirement, e.g., a whole set of requirements comply with the bottleneck requirement and remain pending until the bottleneck requirement is resolved.

Determination of the layout for the graphic visualization may be performed using a variety of algorithms for laying out nodes in a hierarchical fashion. In one exemplary embodiment of the disclosure an algorithm disclosed by Sugiyama, K., et al., in "Methods for Visual Understanding of Hierarchical Systems, IEEE Transactions on Systems", Man and Cybernetics, SMC-11(2):109-125, January 1981, and exemplified in "Graph Drawing and Applications for Software and Knowledge Engineers, World Scientific, Singapore, 2002, is modified and implemented for processing the second data representation for generating a graphic visualization.

Input to the modified Sugiyama algorithm is a directed acyclic graph, and the output is a hierarchy of nodes organized into horizontal layers. Systems requirements typically flow down in a directed acyclic nature. A hierarchical tree representation for systems requirements is, by definition, directed and acyclic. Additionally, if the first data representation is directed and acyclic, the second data representation will also be directed and acyclic. If the input data representation does, however, include a cycle, the algorithm executes for an infinite amount of time. The display on the output device 210 can indicate that a cycle was encountered and that a correction to the input should be made.

The modified Sugiyama algorithm is capable of performing the following steps:

1. Assigning vertical layers to the input data representation to form a proper hierarchy. Dummy nodes may be inserted during this step.
2. Minimizing the edge crossings in the displayed graphic visualization for readability.
3. Using priority layout heuristic to specify positions of the nodes within a particular layer.
4. Removal of dummy nodes which were inserted in Step 1, and replacing the nodes with bends in the line.

The steps are now described in greater detail.

In Step 1, the vertical level of each node is calculated in order to layout the entire graphic visualization in one direction (e.g., top to bottom) with the node which has no incoming edge (e.g., the source or root node) being at the top, and the rest of the nodes fanning out progressively downwards. This step partitions the entire directed graphic visualization G=(V, A) into $V_1, V_2, \ldots, V_h$ such that i<j when (u, v)$\in$A, u$\in V_i$ and v$\in V_j$. Accordingly, the source node is always placed higher than the target node for any edge belonging to the graphic visualization. For edge e=(u, v), u$\in V_i$, v$\in V_j$, the span of edge e is s(e)=j−i.

In this step, after assigning the nodes to the vertical layers, the hierarchical visual graph is transformed into a proper hierarchical graph. That is, for the long edge (u, v) joining vertex u on the ith layer and vertex v on the jth layer, by adding dummy vertices $v_1, v_2, \ldots, v_{j-i-1}$, the edge (u, v) is replaced by path u=$v_o$->$v_1$->$\ldots$->$v_{j-i}$=v. The reason for adding the dummy vertices is that it is difficult to handle crossings of long edges, and from Step 2 onwards, the span of all edges are one (i.e., the graph is assumed to be proper). It is desirable to have as few dummy vertices as possible to reduce machine computation time, reduce the number of bends that occur at dummy vertices, and to provide shorter edges which are easier for a human being to follow than long edges.

At Step 2, a determination of the order of vertices on each layer is made, which further achieves the step of minimization of edge crossings. The number of edge crossings in a drawing of a proper hierarchical graph is not dependent on the exact position of vertices, but on the order of vertices within each layer. Thus, the problem of minimizing the edge crossings is a combinatorial problem of choosing the appropriate order for each layer, and not a geometrical problem of choosing the x coordinate of each vertex.

Suppose that G=(V, A, h) is a proper hierarchical graph of height h. For G, the partition of V is expressed as $V_1, V_2, \ldots, V_h$, and of A as $A_1, A_2 \ldots, A_{h-1}$, where $A_i$ is a subset of $V_i X V_{i+1}$. When an order $\sigma_i$ for all elements in each layer $V_i$ is given, then G is called an h layer graph and is written G=(V, A, h, $\sigma$). Where $\sigma=(\sigma_1, \sigma_2, \ldots, \sigma_h)$.

A matrix realization is used for the h layer graph G=(V, A, h, $\sigma$). The matrix $M^{(i)}=M(\sigma_i, \sigma_{i+1})$ represents $A_i$ as a $\|V_i\| X \|V_{i+1}\|$ matrix, where the rows representing the vertices of $V_i$ are ordered from the top by $\sigma_i$, and the columns are ordered by the order $\sigma_{i+1}$ on the vertices of $V_{i+1}$. The (k, $\lambda$) element $m_{(k l)}^{(i)}$ of $M^{(i)}$ is given by:

$$m_{(kl)}^{(i)} = \begin{cases} 1 & \text{if } (v_k, v_l) \in A_i; \\ 0 & \text{otherwise.} \end{cases}$$

$M^{(i)}$ is called the incidence matrix. When the incidence matrices are arranged in order, it is called the matrix realization $\zeta$ of the h layer graph, and is written as:

$$\zeta(\sigma_1, \ldots \sigma_h) = M^{(i)} \ldots M^{(h-1)}$$

The row vector r(v) corresponding to the vertex v of the incidence matrix $M^{(i)}$ expresses the incidence relationship of vertex v of the ith layer and vertices of the i+1th layer. When p and q are the number of vertices of the ith layer and the i+1th layer, the number c of crossings of the edge between the jth and the kth vertices $v_j$ and $v_k$ of the ith layer and vertices of the i-1th layer is given by:

$$c(r(v_j), r(v_k)) = \sum_{\alpha=1}^{q-1} \sum_{\beta=\alpha+1}^{q} m^{(i)}_{(j\beta)} m^{(i)}_{(k\alpha)}$$

Therefore the number of crossings between the ith layer and the i+1th layer is given by:

$$C(M^{(i)}) = \sum_{j=1}^{p-1} \sum_{k=j+1}^{p} \left( \sum_{\alpha=1}^{q-1} \sum_{\beta=\alpha+1}^{q} m^{(i)}_{(j\beta)} m^{(i)}_{(k\alpha)} \right)$$

Therefore the total number of crossings $C(\zeta)$ of $\zeta$ can be found by:

$$C(\zeta) = C(M^{(i)}) + \ldots + C(M^{(h-1)})$$

The row barycenter $\gamma_k$ and column center $\rho_1$ of incidence matrix $M=(m_{kl})$ are defined as:

$$\gamma_k \Sigma_{l=1}^{q} l . m_{kl} | \Sigma_{l=1}^{q} m_{kl}$$

$$p_l = \Sigma_{k=1}^{p} k . m_{kl} | \Sigma_{k=1}^{p} m_{kl}$$

Using a barycenter method, for the matrix realization $\zeta = M(\sigma_1, \sigma_2)$ of a two-layer graph, the order of columns is fixed. When rearranging the order of rows, the row barycenters are calculated and arranged in monotonically increasing order (however, in the case of equal barycenters, the initial order is preserved). Likewise, the order of rows is fixed, and when rearranging the order of columns, the column barycenters are calculated and arranged in monotonically increasing order. When $M(\sigma'_1, \sigma_2)$ is obtained by rearranging the columns of $M(\sigma_1, \sigma_2)$, the process is called row barycenter ordering and written as BOR(M). The column barycenter ordering, BOC(M), is defined in the same way. By repeatedly alternating row and column barycenter ordering, a reduction in the number of crossings can be achieved.

In accordance with the Sugiyama algorithm, the edge crossings reduction procedure includes PHASE 1 and PHASE 2. In PHASE 1, the alternating row/column barycenter ordering is carried out for a predetermined number of iterations (or until the number of crossing ceases). In PHASE 2, if there are any rows or columns of equal barycenters left at the end of PHASE 1, the order of these rows or columns is reversed by units of equal barycenter groups, and PHASE 1 is carried out. Therefore, PHASE 2 contains PHASE 1 as a sub-algorithm. IN PHASE 2, the operation to reverse the order of equal barycenter rows for M is written ROR(M), and the operation to reverse the order of equal barycenter columns for M is written ROC(M).

For h layer graphs as for 2 layer graphs, the barycenter ordering can be applied repeatedly consecutively to each layer. That is, first the ordering of layer $V_1$ is decided, then for i=1, 2, 3, . . . , h-1, the order of layer $V_i$ is fixed and the order of layer $V_{i+1}$ is decided such that the number of crossings between layer $V_i$ and layer $V_{i+1}$ is reduced, which is called the downward pass. Conversely, going from layer $V_h$ to layer $V_i$ is called the upward pass. The algorithm is the same as for two-layer graphs.

In Step 3, from the crossing number reduction methods of the previous section, the layout order of vertices σ* with few crossings is determined. To decide the placement of vertices in this step, σ* is received as input, and the aim is to achieve the four drawing rules, i.e., least separation, closeness, balance, straight lines. This can be achieved using either the quadratic programming method, or using a heuristic, namely, a priority layout method. In accordance with the exemplary algorithm of the present disclosure, a priority layout method is used to minimize machine computing time. The basic concepts are similar to the multi-layer barycenter method, and improvement steps for the layout coordinates of vertices on each layer of a multi-layer graph are consecutively repeated across all layers from top to bottom, and bottom to top. Priority is used for each vertex in improvement of vertex layout coordinates in each layer. The outline of algorithm is as follows:

1. The initial coordinates of each vertex (the kth vertex of the ith layer) of V are given by $x_{ik} = x_o + k$. Here $x_o$ is a given integer, which is assumed to be zero in this example, as this merely defines an x offset of the graph drawing. The variable k is termed as the horizontal level of the node, for that particular vertical level. These vertical and horizontal levels constitute a grid-like structure and the nodes are placed finally at the grid points.
2. Repeating highest layer->lowest layer->highest layer->lowest layer, moving downward twice and upward once, the following are carried out for each vertical layer (the ith layer):
    2.1. For $V_i$, when moving downward, the priority of the real vertices are given by their Up total degree, and when moving upward, the priority of the real vertices are given by their Down total degree for achieving balance. Furthermore, the highest priority is given to dummy vertices for achieving straightness of long edges.
    2.2. For $V_i$, the improvement of the layout coordinates $x_{ik}$ of each vertex (the kth) is carried out in order of highest priority according to the following:
        2.2.1. When moving downward, the kth vertex is, fulfilling the conditions below, brought as close as possible to the Up barycenter, and when moving upward, the kth vertex is, fulfilling the conditions below, brought as close as possible to the Down barycenter.
            (1) The layout coordinates of vertices are limited to integer values. Also a vertex cannot have the same coordinate values as another vertex (achieving least separation).
            (2) The layout order of vertices must not be changed (achieving minimization of number of crossings).
            (3) In order to be brought closer to the Up (or Down) barycenter, the only vertices, which can be moved are those with lower priority than the object of improvement, the kth vertex (achieving closeness).

In accordance with the present disclosure, the following modifications have been made to the Sugiyama algorithm:
1. The maximum number of iterations for PHASE 2 is selectable by the user, as opposed to the original Sugiyama algorithm which continues the PHASE 2 iterations until the minimum number of crossings ceases to decrease.

2. During execution of PHASE 1 and PHASE 2 iterations, a snapshot of the generated graph is saved whenever we encounter a topology having a lower number of edge crossings than what is stored in a variable defined as the minimum global crossings, as it was discovered during testing that sometimes the minimum number of global crossings achieved is not the final result outcome of the algorithm.

3. The user may select whether to use a random method or the reverse barycenter method described above for minimizing edge crossings. In the random method, a node is randomly assigned at each starting point of PHASE 1 and PHASE 2 is eliminated. Accordingly, using the random method, computation steps are reduced relative to the reverse barycenter method.

4. Using a priority layout method for achieving a final graph balance, the user may heuristically select a horizontal level at which to start the iterations, which may result in a better graph balance.

5. In PHASE 2 of the Sugiyama algorithm, the procedure for swapping two nodes with equal barycenters followed by carrying out PHASE 1 is performed by swapping all nodes with equal barycenters and then carrying out phase 1 minimizing computational steps.

6. A clustering constraint for clustering of requirements is user selectable. A clustering constraint forces the requirement nodes to be positioned at respective coordinates defining vertical displacement along a horizontal level so that all of the requirement nodes along a horizontal level have a same attribute value (e.g., assigned level, geographical location, etc.) for a particular attribute. The attribute to be used for determining the horizontal level within which the requirement nodes are clustered may also be selectable. When a user chooses not to enforce (e.g., select) the clustering constraint, the requirement nodes are not clustered in horizontal levels in accordance with their attribute values for any particular attribute. Accordingly, a horizontal level of requirement nodes may contain requirement nodes having a variety of attribute values for any particular attribute. When the clustering constraint is not enforced, a layout of requirement nodes may be possible with even fewer edge crossings.

Figure 5:
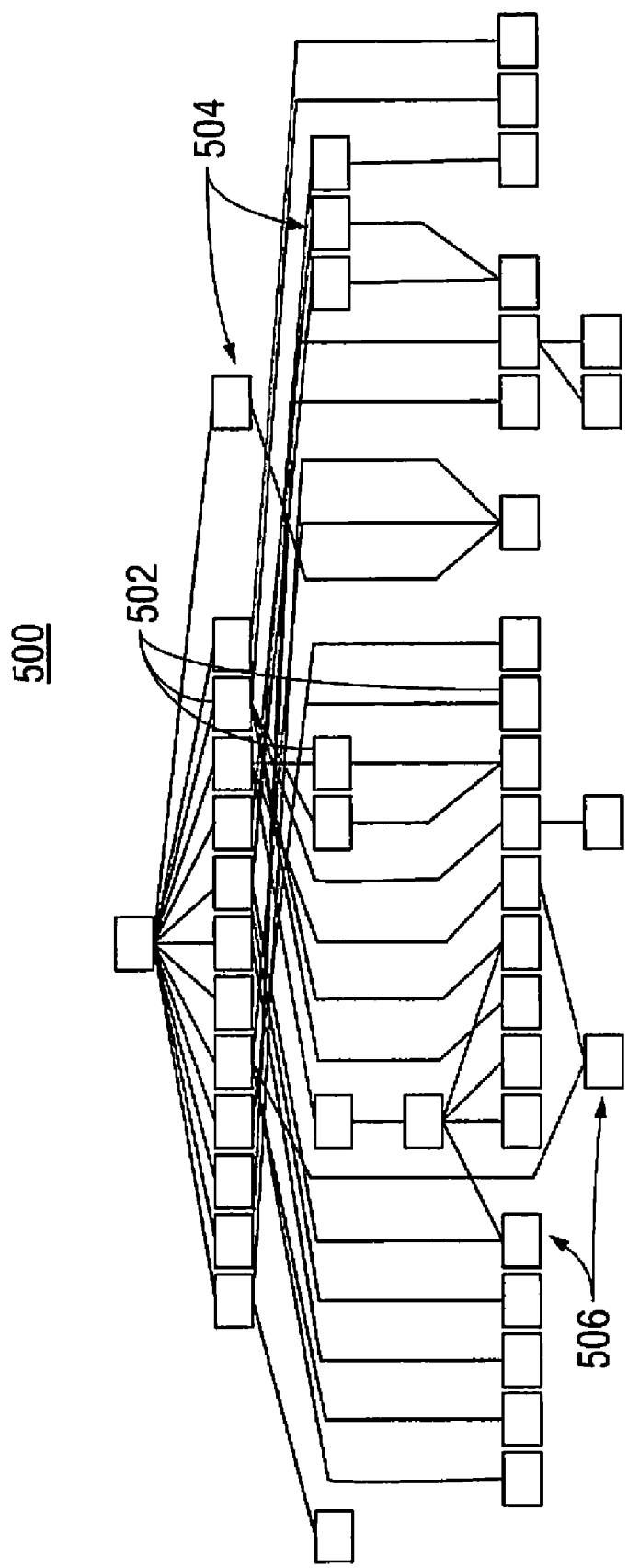
FIG. 5 is an exemplary graphic visualization generated by the system shown in FIG. 2.

FIG. 5 shows the layout of an exemplary graphic visualization 500 in which the clustering constraint is enforced. Requirement nodes 502, represented as boxes, are clustered into horizontal groups based on their attribute values for a particular attribute (e.g., assigned level). Requirement nodes having a first attribute value are clustered in a first horizontal level indicated by reference numeral 504, and requirement nodes having a second attribute value are clustered in a second horizontal level indicated by reference numeral 506. There are no duplicate nodes in graph 500. The graph 500 shown in FIG. 5 may be achieved by processing an input directed acyclic graph, such as the second data representation, in accordance with the modified Sugiyama algorithm described above, or in accordance with another algorithm for generating a hierarchical graph layout. In an actual display or printout of the graphic visualization 500, the title (or other field) associated with the systems requirements corresponding to the respective requirement nodes 502 boxes are provided in the appropriate boxes. For an interactive display, when the user selects a requirements node 502, additional information corresponding to the selected requirements node 502 may be displayed, e.g., in a pop-up window.

The graphic visualization 500 may also be generated without selecting the clustering constraint. The requirement nodes 502 shown in levels 504 and 506 may be mixed in one or more horizontal levels, and even fewer edge crossings may result. The requirement nodes 502 may be color coded in accordance with their respective associated attribute values for visual distinction.

The GUI module 208 provides a GUI upon activation by a user of the graph generator module 204 and/or the visualization module 206. The GUI presents the user with options for selecting an action, e.g., via menus, an interactive graphical editor and/or dialogue boxes. Examples of actions which may be selected include selecting a first data representation (which may be a data structure), generating a second data representation based on the first data representation, selecting subsections of the second data representation to display, selecting attributes to display with the respective systems requirements, merging the second data representation or sub-section thereof with another data representation, modifying the second data representation, applying the modifications to the first data representation or another data representation related to the second data representation, displaying the first and second data representations and/or displaying information related to sub-sections or selected systems requirements of the second data representation.

Figure 6:
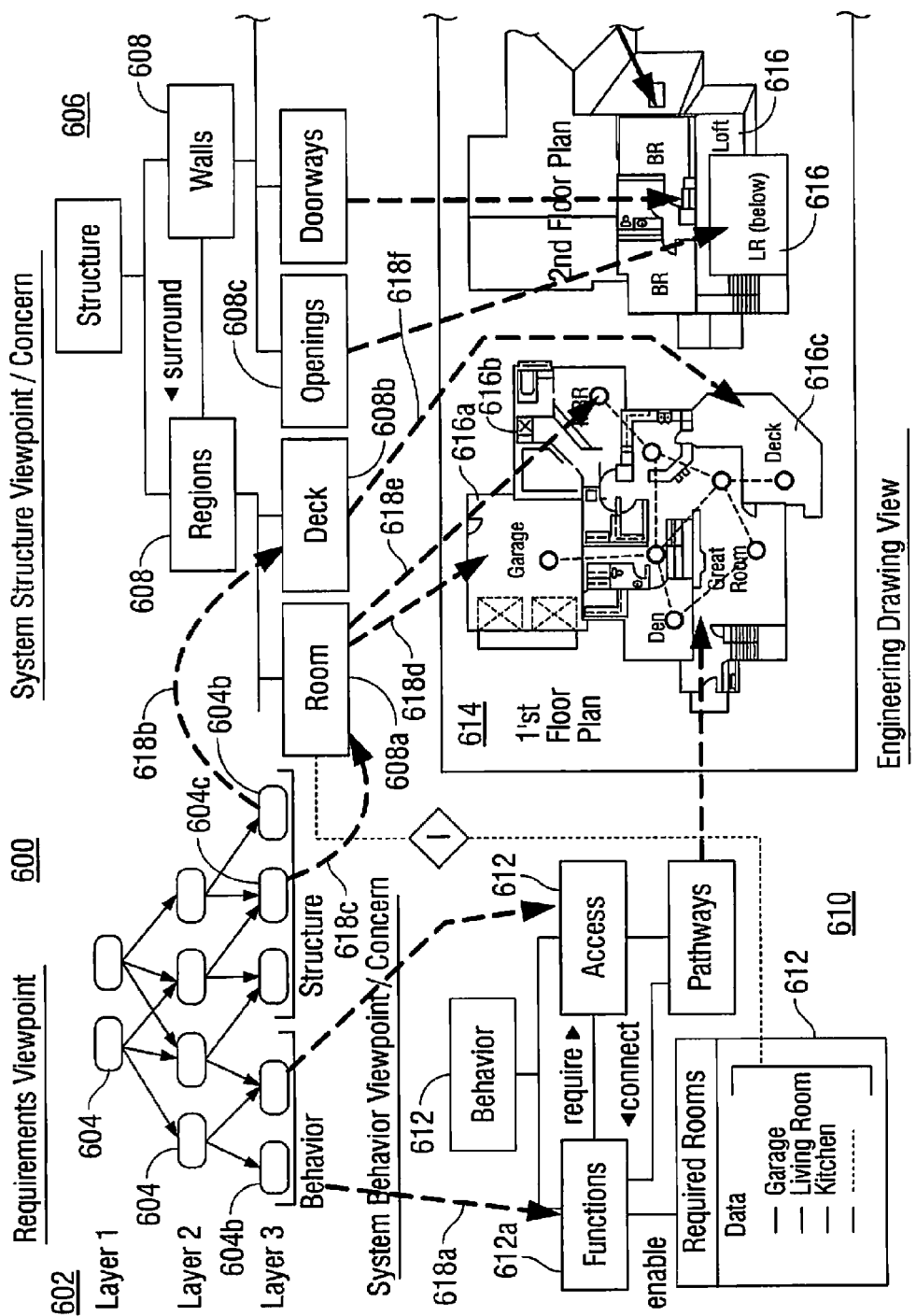
FIG. 6 is a diagram of a systems development system in accordance with the present disclosure.

FIG. 6 shows a systems development system 600 including a systems requirement representation 602 which is a hierarchical graph having nodes 604, which includes no duplicate nodes, and data representations of other components used for systems development, such as a system structure viewpoint representation 606 having elements 608, a system behavior viewpoint 610 having elements 612, and an engineering drawing view representation 614 having elements 616, where each of the representations is a data representation and/or visualization of the data representation. The representations 602, 606, 610 and 614 are linked via links 618. The links 618 represent relationships between linked nodes, elements from at least two different representations of the representations 602, 606, 610 and 614.

For example, link 618a represents a relationship between node 604a and element 612a, link 618b represents a relationship between node 604b and element 608b, link 618c represents a relationship between node 604c and element 608a, link 618d represents a relationship between element 608a and element 616a, link 618e represents a relationship between element 608a and element 616b, and link 618f represents a relationship between element 608b and element 616c. Furthermore, the relationship between node 604b and element 616c is represented by links 618b and 618f, the relationships between node 604c and elements 616a and 616b are represented by links 618c, 618d and 618e.

Information pertaining to the relationships between nodes 604 of the hierarchical graph of representation 602 and elements of representations 606, 610 and 614 can be accessed, such as by displaying a graphic visualization of the system 600 and/or accessing the node 604, or the elements of the representations 606, 610 and 614 via a GUI provided by GUI module 208 (or a network of GUI's). By providing the relationships 618, all of the systems requirements involved in developing an element of the system 600 are readily accessible. Since there are no duplicate nodes 604, it is possible to determine visually, or by submitting a query, all of the nodes which must be resolved in order to resolve an element of the representations 606, 610 and 614. Conversely, by clicking on an object in the engineering element 616, reverse traceability links are provided for allowing engineers to see the list of requirements to which the object 616 complies.

The described embodiments of the present disclosure are intended to be illustrative rather than restrictive, and are not intended to represent every embodiment of the present disclosure. Various modifications and variations can be made without departing from the spirit or scope of the disclosure as set forth in the following claims both literally and in equivalents recognized in law.

The invention claimed is:

1. A method for generating a graph data representation having a plurality of nodes corresponding to respective systems engineering requirements, the method comprising a hardware processor performing the steps of:
   accessing first data representation of a collection of systems requirements and relationships therebetween; and
   generating a second data representation of the systems requirements comprising:
   accessing respective systems requirements of the collection of systems requirements;
   creating a node to correspond to each accessed systems requirement of the collection of systems requirements if a node corresponding to the accessed systems requirement does not exist; and
   creating an edge between the created or pre-existing node and each node corresponding to a systems requirement having a relationship with the accessed systems requirement;
   wherein a hierarchical graphic visualization of the second data representation is generated by the hardware processor performing the steps of:
   inserting at least one dummy node as an intermediary step while generating the graphic visualization, wherein at least one third edge is provided for connecting the at least one dummy node with the plurality of second nodes, wherein the at least one second edge and the at least one third edge collectively preserve the relationships previously defined by the at least one second edge; and
   removing a dummy node of the at least one dummy node, and connecting together the third edges that were previously connected to the removed dummy node
   wherein each node of the second data representation corresponds to a different systems requirement of the collection of systems requirements and is a node of said graph data representation.

2. The method according to claim 1, wherein the hardware processor further performs the steps of generating a graphic visualization of the second data representation.

3. The method according to claim 2, wherein the graphic visualization is in accordance with a hierarchical graph layout in which each node of the second data representation is arranged graphically in at least two levels.

4. The method according to claim 3, wherein each systems requirement of the collection of systems requirements of the first data representation has at least one attribute, and wherein the level for each node in the hierarchical graph layout is determined in accordance with a selected attribute of the at least one attribute of the first data representation of the respective nodes.

5. The method according to claim 1, wherein the first data representation is a hierarchical tree.

6. The method according to claim 1, wherein the first data representation is a database.

7. The method according to claim 1, wherein the first data representation is generated by a systems engineering requirements management tool.

8. The method according to claim 1, wherein the first data representation is an XML document.

9. The method according to claim 1, wherein the first data representation is AP233 compliant.

10. A system for generating a graph data representation having a plurality of nodes corresponding to respective engineering systems requirements, the system comprising:
    a processor assembly having at least one processor having access to a first data representation of a collection of systems engineering requirements and relationships therebetween; and
    a memory storing a series of executable instructions executable by the at least one processor for providing for generating a second data representation comprising:
    accessing respective systems requirements of the collection of systems requirements;
    creating a node to correspond to each accessed systems requirement if a node corresponding to the accessed systems requirement does not exist; and
    creating an edge between the created or pre-existing node and each node corresponding to a systems requirement of the collection of systems requirements having a relationship with the accessed systems requirement;
    wherein each node of the second data representation corresponds to a different systems requirement of the collection of systems requirements and is a node of said graph data representation.

11. The system according to claim 10, wherein:
    each systems requirement of the collection of systems requirements of the first data representation has at least one attribute;
    the series of executable instructions further providing for generating a graphic visualization of the second data representation wherein the graphic visualization is in accordance with a hierarchical graph layout in which each node of the second data representation is arranged graphically in at least two levels; and
    the level for each node in the hierarchical graph layout is determined in accordance with a selected attribute of the at least one attribute of the first data representation of the respective nodes.

12. The system according to claim 11, wherein the series of executable instructions further provides for modifying the graphic visualization and applying the modification to at least one of the first and second data representations.

13. The system according to claim 11, wherein the series of executable instructions further provides for connecting a node of the graphic visualization with at least one data element of another data representation.

14. The system according to claim 10, wherein the series of executable instructions further provides for connecting a second node of the plurality of second nodes to at least one data element of another data representation.

15. The system according to claim 10, wherein a hierarchical graphic visualization of the second data representation is generated by the hardware processor performing the steps of:
    inserting at least one dummy node as an intermediary step while generating the graphic visualization, wherein at least one third edge is provided for connecting the at least one dummy node with the plurality of second nodes, wherein the at least one second edge and the at least one third edge collectively preserve the relationships previously defined by the at least one second edge; and
    removing a dummy node of the at least one dummy node, and connecting together the third edges that were previously connected to the removed dummy node.

16. A system for generating a hierarchical graphic visualization of a graph data representation having a plurality of nodes corresponding to respective systems engineering requirements, the system comprising:
- a processor assembly having at least one processor for accessing a graph data representation having a plurality of first edges and a plurality of first nodes corresponding to the respective systems requirements, wherein each first node of the plurality of first nodes corresponds to a different systems requirement of the respective systems requirements and has an associated at least one attribute, and each first node is connected to at least one other first node by at least one first edge of the plurality of first edges, wherein the at least one first edge defines relationships between the first nodes of the plurality of first nodes; and
- a memory storing a series of executable instructions executable by the processor assembly for generating a hierarchical graphic visualization of the graph data representation having a plurality of second edges and a plurality of second nodes arranged graphically in at least two levels, each second node of the plurality of second nodes corresponding to a respective first node of the plurality of first nodes and connected to at least one other second node by at least one second edge of the plurality of second edges, the at least one second edge preserving the relationships defined by the at least one first edge, wherein each node is arranged in a level of the at least two levels in accordance with an attribute of the at least one attribute associated with the node;

wherein the hierarchical graphic visualization is generated by performing the steps of:
- inserting at least one dummy node as an intermediary step while generating the graphic visualization, wherein at least one third edge is provided for connecting the at least one dummy node with the plurality of second nodes, wherein the at least one second edge and the at least one third edge collectively preserve the relationships previously defined by the at least one second edge; and
- removing a dummy node of the at least one dummy node, and connecting together the third edges that were previously connected to the removed dummy node.

17. The system according to claim 16, wherein the hierarchical graphic visualization is generated by executing the series of executable instructions to form the hierarchical graphic visualization as a proper hierarchy.

18. The system according to claim 16, wherein third edges which are connected together are disposed at an angle less than ninety degrees relative to one another.

19. The system according to claim 16, wherein the hierarchical graphic visualization is generated by executing the series of executable instructions to minimize intersections between edges of at least one of the at least one second edge and the at least one third edge.

20. The system according to claim 16, wherein the hierarchical graphic visualization is generated by executing the series of executable instructions to specify positions of second nodes of the plurality of second node within a level of the at least one level.

21. The system according to claim 20, wherein the hierarchical graphic visualization is generated by executing the series of executable instructions to specify the positions using a priority heuristic.

22. The system according to claim 16, wherein the series of executable instructions further generates a graphical user interface (GUI) for interacting with a user to allow the user to select an action selected from the group of actions consisting of:
- selecting a graphic data representation to access; activating generation of the graphic visualization; selecting a subsection of the graphic visualization to be displayed;
- selecting display of at least one attribute of the at least one attribute associated with a systems requirement corresponding to a selected second node of the plurality of second nodes; modifying the graphic visualization; applying the modification to the graphic visualization to another data representation; merging at least a portion of the graphic visualization with another graphic visualization; displaying at least a portion of the graph data representation; modifying the graph data representation; displaying information related to a selected portion of the graphic visualization; displaying information related to selected portion of the graph data representation; and merging at least a portion of the graph data representation with another graph data representation.

23. The system according to claim 16, wherein the hierarchical graphic visualization is generated by executing the series of executable instructions to select a sub-section of the graphic visualization to display.

24. The system according to claim 16, wherein the hierarchical graphic visualization is generated by executing the series of executable instructions to display information related to a selected portion of the graphic visualization.

25. The system according to claim 16, wherein the series of executable instructions further provides for merging at least a portion of the graph data representation with another graph data representation.

26. The system according to claim 16, wherein the series of executable instructions further provides for modifying the graphic visualization.

27. The system according to claim 26, wherein the series of executable instructions further provides for applying the modification of the graphic visualization to another data representation.

28. The system according to claim 16, wherein the series of executable instructions further provides for merging a least a portion of the graphic visualization with another graphic visualization.

* * * * *